(12) United States Patent
Brix

(10) Patent No.: US 6,345,790 B1
(45) Date of Patent: Feb. 12, 2002

(54) SUBSONIC AIRCRAFT WITH BACKSWEPT WINGS AND MOVABLE WING TIP WINGLETS

(75) Inventor: Wolfgang Brix, Delmenhorst (DE)

(73) Assignee: DaimlerChrysler Aerospace Airbus GmbH, Hamburg (DE)

(*) Notice: Subject to any disclaimer, the term of this patent is extended or adjusted under 35 U.S.C. 154(b) by 0 days.

(21) Appl. No.: 09/591,880

(22) Filed: Jun. 12, 2000

(30) Foreign Application Priority Data

Jun. 12, 1999 (DE) .......................................... 199 26 832

(51) Int. Cl.⁷ ............................................. B64C 23/06
(52) U.S. Cl. ............................. 244/199; 244/46; 244/91
(58) Field of Search .......................... 244/46, 198, 199, 244/91

(56) References Cited

U.S. PATENT DOCUMENTS

| 3,270,988 A | * | 9/1966 | Cone, Jr. ..................... 244/199 |
| 4,172,574 A | * | 10/1979 | Spillman .................... 244/199 |
| 4,598,885 A | * | 7/1986 | Waitzman ................... 244/199 |
| 4,722,499 A | | 2/1988 | Klug | |

FOREIGN PATENT DOCUMENTS

| DE | 2149956 | 4/1973 |
| DE | 3242584 | 5/1984 |
| DE | 3621800 | 1/1988 |
| GB | 1584348 | 2/1981 |

* cited by examiner

Primary Examiner—Galen L. Barefoot
(74) Attorney, Agent, or Firm—W. F. Fasse; W. G. Fasse

(57) ABSTRACT

A subsonic aircraft having backswept lifting wings is equipped with individually rotatable winglets at the wing tips thereof, in order to reduce drag during cruise flight, to minimize the dangers posed by wing tip vortices to following aircraft during take-off and landing, and to minimize the total wingspan during ground operations, with respective different positions of the winglets. A streamline-shaped rotation body made up of at least two individually rotatably supported rotation segments is mounted on the wing tip of each lifting wing. A respective winglet is mounted on each respective rotation segment. Each rotation segment with its associated winglet is individually rotatable about a rotation axis of the rotation body extending substantially parallel to the aircraft lengthwise axis. Thereby, each winglet is individually pivotable to any selected pivot angle relative to a horizontal plane extending through the rotation axis. Each winglet and its associated rotation segment is rotatable through an angular range between maximum end limits of at least +90° (vertically upward) and at least −90° (vertically downward) relative to the horizontal plane.

26 Claims, 2 Drawing Sheets

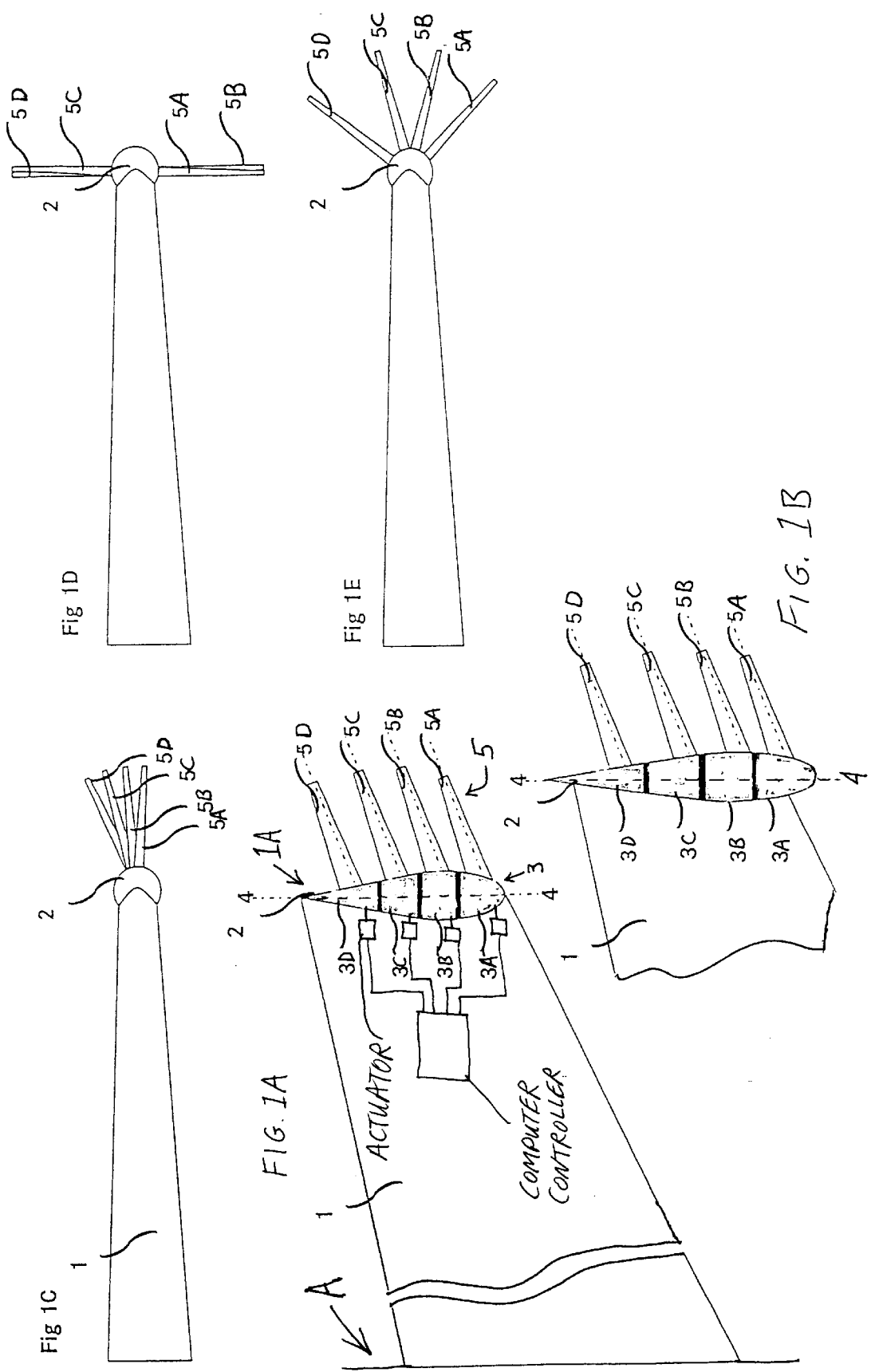

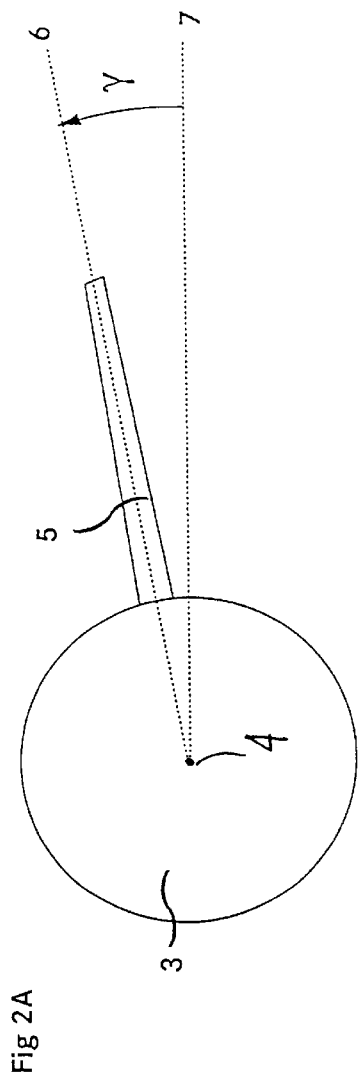
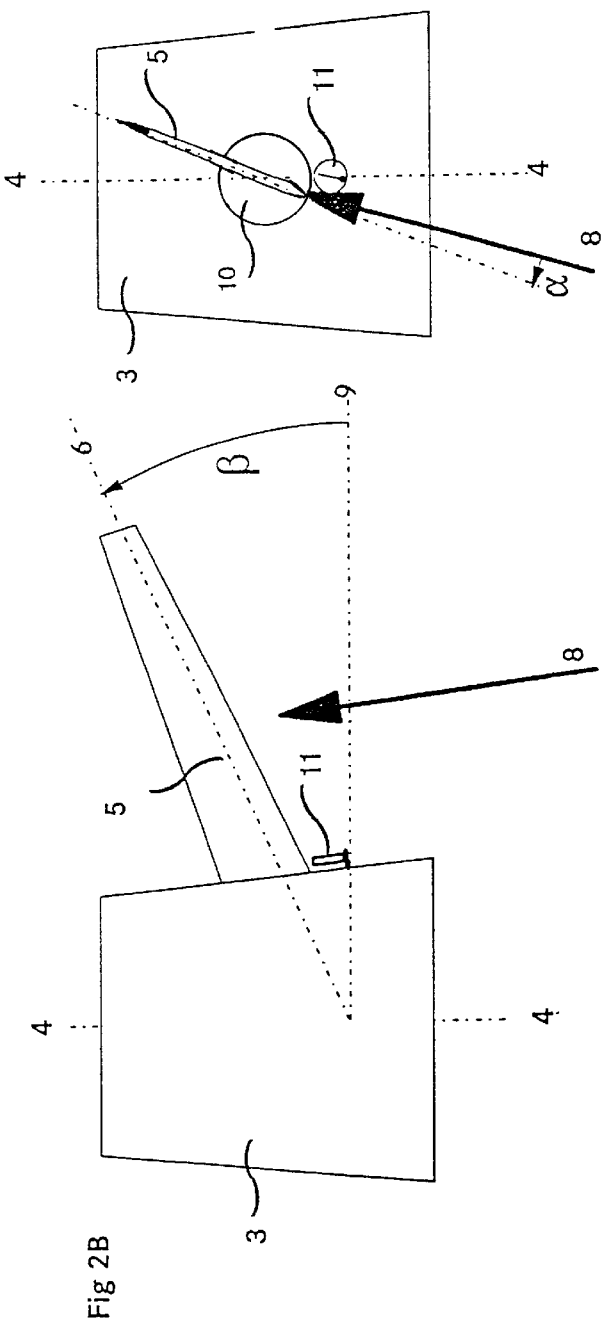

SUBSONIC AIRCRAFT WITH BACKSWEPT WINGS AND MOVABLE WING TIP WINGLETS

PRIORITY CLAIM

This application is based on and claims the priority under 35 U.S.C. §119 of German Patent Application 199 26 832.0, filed on Jun. 12, 1999, the entire disclosure of which is incorporated herein by reference.

FIELD OF THE INVENTION

The invention relates to a subsonic aircraft preferably having backswept wings, whereby the tips of the lifting wings are equipped with so-called winglets for reducing the induced flow resistance or drag during cruise flight and especially also for minimizing the dangers posed by wing tip vortices to aircraft is following an aircraft equipped with such winglets.

BACKGROUND INFORMATION

In order to achieve the desired reduction of the induced flow resistance or drag during cruise flight, various different fixed winglet forms, of which the arrangement cannot be adjusted or moved during flight, have become known in the art. For example, the following general type of winglets are known; winglets that are suggestive of end disks secured to the wing tips; simple or single winglet arrangements including only a single winglet or wing end directed upward or downward; double winglet arrangements having two winglets directed upward or downward; multiple winglet arrangements in which several winglets are generally arranged in a fan pattern; and loop-shaped winglets or so-called spiroids.

German Patent Laying-Open Publication 36 21 800 describes an aircraft including a fuselage and lifting wings secured thereto. In the known aircraft, one or more individual small wings or winglets are arranged on the wing tip of each lifting wing generally oriented in a direction pointing away from the fuselage. The individual winglets are tilted or pivoted about their lengthwise axis in such a manner so that they point downwardly in the direction of the nose of the lifting wing. The angle of attack or incidence of the individual winglets is adjustable. Furthermore, winglets that have an adjustable length and or that are tiltable or foldable toward the rear are also provided. This tiltability or foldability can be interpreted as a rearward sweep of the individual winglet to as much as 90°. In this context, an optimal reduction of the induced flow resistance can only be achieved at one particular operating condition or point of the aircraft, because the individual winglets are not rotatable about an axis extending parallel to the aircraft lengthwise axis. Furthermore, it is especially not possible to reduce the span width of the aircraft wings equipped with such winglets while the aircraft is parked at a ramp or jetway. As a further disadvantage or limitation, a reduction of the safety risk for following aircraft is achieved only in the reduction of the induced drag. Thus, such an arrangement of winglets provides a significantly lesser degree of reduction of such risk than an arrangement of widely spread winglets with optimal incidence angles and auxiliary surfaces.

German Patent Laying-Open Publication 32 42 584 and related U.S. Pat. No. 4,722,499 (Klug) disclose an arrangement of auxiliary surfaces on the wing tips of a lifting wing. More particularly, preferably two adjacent auxiliary surfaces extend outwardly in the direction of the span width, whereby these auxiliary surfaces can be subjected to a controlled rotation of their total surface or of a partial surface thereof so as to vary the effectiveness thereof. The auxiliary surfaces are rotatable about an axis that lies approximately in the plane of the profile chord of the lifting wing. The individual winglets are not torsionally warpable or twistable, or torsionally adjustable, which leads to a lower effectiveness than if the winglets were so torsionally twisted. Further, in this known arrangement it is not possible to form large counter vortices.

The above described disadvantages also apply to the high lift wing arrangement known from German Patent Laying-Open Document 2 149 956, in which the wing tip comprises two or more partial wings or winglets, which are tiltable about an axis running in the aircraft lengthwise direction. These partial wings or winglets can be adjusted into a tilted position in which they are displaced successively in a fan-like arrangement relative to each other, wherein the forwardmost partial wing is adjusted the furthest upward while the rearmost partial wing is adjusted the furthest downward.

Published British Patent Specification 1 584 348 discloses devices or arrangements for reducing flow resistance or drag. These known devices comprise winglets that are adjustable about an axis extending parallel to the aircraft lengthwise axis. Disadvantageously, the adjustment of the winglets is achieved only in a collective manner, namely all of the winglets must be adjusted together as a group, without the respective angles between individual ones of the winglets being adjustable. Therefore, it is not possible to provide a wider spreading of the winglets relative to each other, so that the reduction of the safety risk posed to following aircraft is very small or minimal without the provision of additional auxiliary surfaces.

Two significant problems have been crystallized or realized during the research and development of future high capacity aircraft. These two problems relate to issues other than the reduction of the induced flow resistance or drag. For one, it wherein the tips of the lifting wings are equipped with so-called winglets. Particularly according to the invention, a streamline shaped rotation body is arranged at the tip of each lifting wing, whereby each such rotation body comprises at least two rotatably supported rotation segments. Further according to the invention, a respective winglet is mounted on each respective rotation segment, and each rotation segment with its associated winglet is individually pivotable in a prescribed angular range relative to the aircraft horizontal plane, about an axis of the rotation body that is approximately parallel to the aircraft lengthwise axis. Here, "approximately parallel" means within such a range to be generally parallel to the longitudinal axis of the aircraft or to the relative wind airflow direction or to the chord line of the wing at the wing tip. More particularly, the winglet or winglets of each respective rotation segment is/are pivotable through an angular range to respective pivoting end positions with an angle of at least +90° (vertical or perpendicularly upward relative to the horizontal plane of the aircraft) or of at least −90° (vertical or perpendicularly downward relative to the horizontal plane of the aircraft), with the angular range spanning between these end positions.

In addition to being rotatable about the axis of the rotation body, each winglet is preferably arranged on the respective rotation segment with a fixed or variable sweepback angle as well as a variable angle of incidence relative to the airflow direction or relative wind. The rotation body preferably has an optimized aerodynamic streamline contour that can be generally has been determined that the wing span width of such aircraft cannot become ever larger at will. Rather, the maximum wing span width must be limited to 80 m, for example, even though a further demand for improving the glide ratio of such aircraft exists, which would be served by further increasing the wing span width. As a second problem, such large high capacity aircraft have further increased the significant risk posed to aircraft that follow after such a high capacity aircraft during take-off or landing and thereby fly into the wing tip vortex wake of the high capacity aircraft. As a result, there is a high demand for measures that will minimize the negative effects of such wing tip vortices generated at the wing tips of high capacity aircraft.

SUMMARY OF THE INVENTION

In view of the above, it is an object of the invention to provide measures on a subsonic aircraft that achieve a reduction of the induced flow resistance or drag, make it possible to fly with a greater wingspan width as compared to the wingspan of the aircraft during parking of the aircraft at a ramp or jetway, and simultaneously achieving a minimization of the risks of wing tip vortices posed to following aircraft during flight. The invention further aims to avoid or overcome the disadvantages of the prior art, and to achieve additional advantages, as are apparent from the present specification.

The above objects have been achieved according to the invention in a subsonic aircraft, preferably having back-swept wings, regarded as a teardrop, torpedo, or bullet shape made up of the individual rotation segments, and preferably includes four of such rotation segments with four respective winglets for example. The adjustment of each winglet can be carried out individually and independently of the other winglets by relatively simple means, using any conventionally known actuators for rotating and tilting each winglet as required, as well as any conventionally known sensors for sensing the respective actual position of each individual winglet. The winglets may respectively be provided with trailing edge flaps. The possibility is provided that all winglets can be used as ailerons. The term "rotation" as used herein to describe the motion of the rotation segments and winglets about the rotation axis does not require free 360° rotation, but rather especially refers to a partial rotation or pivoting through less than 360°.

In view of the relatively simple, adaptable and flexibly configurable arrangement according to the invention, the present winglet arrangement can easily be retrofitted on existing aircraft, as well as being incorporated into new aircraft.

BRIEF DESCRIPTION OF THE DRAWINGS

In order that the invention may be clearly understood, it will now be described in detail in connection with example embodiments, with reference to the accompanying drawings, wherein:

FIG. 1A is a schematic top plan view of a backswept lifting wing of a subsonic aircraft, equipped with winglets mounted on a streamline shaped rotation body at the wing tip of the wing, according to the invention;

FIG. 1B is a schematic top plan view similar to that of FIG. 1A, but showing an alternative embodiment with a longer rotation body in comparison to the local chord length of the wing tip;

FIG. 1C is a schematic front elevation view of a wing equipped with winglets and a rotation body according to the invention at the wing tip thereof;

FIG. 1D is a view similar that of FIG. 1C, but showing the winglets tilted into +90° and −90° positions;

FIG. 1E is a view similar to that of FIG. 1C, but showing the winglets spread further apart over a greater angular range than the arrangement of FIG. 1C;

FIG. 2A is a detail schematic front view of a single rotation segment and a single winglet mounted thereon, to illustrate the pivot angle γ of the winglet relative to a horizontal plane;

FIG. 2B is a detail schematic top plan view of the single rotation segment and single winglet as shown in FIG. 2A, but here illustrating the backsweep angle β;

FIG. 2C is a detail schematic end view or side view of the single rotation segment and winglet of FIG. 2A, as seen from the wing tip end, so as to illustrate the inclination angle α; and FIG. 2D is a schematic sectional view of a detail portion of the winglet arrangement shown in FIG. 2C, in a particular embodiment in which the winglet is equipped with trailing edge flaps.

DETAILED DESCRIPTION OF PREFERRED EXAMPLE EMBODIMENTS AND OF THE BEST MODE OF THE INVENTION

FIGS. 1A and 1B each merely schematically show a portion of a backswept wing 1 of an aircraft A. In FIG. 1A, the aircraft A is schematically indicated, whereby the wingspan length of the wing 1 has been significantly contracted for the sake of a compact schematic drawing. As shown in FIGS. 1A and 1B, a rotation body 2 is mounted at the wing tip 1A of the wing 1. The rotation body 2 overall has a streamlined shape, such as a generally recognized teardrop, torpedo, or bullet shape, with an optimized aerodynamic contour, whereby the maximum thickness of the rotation body 2 may correspond to or be greater than the thickness of the wing 1 at the wing tip 1A.

The length of the rotation body 2 in the aircraft longitudinal direction may correspond to the local wing profile length or chord length as shown in the embodiment of FIG. 1A, or may be greater than the local wing profile length or chord length of the wing 1 as shown in the embodiment of FIG. 1B. In other words, in the embodiment of FIG. 1A, the rotation body 2 does not protrude forward of the leading edge of the wing 1 or aft of the trailing edge of the wing 1, while in the embodiment of FIG. 1B, the rotation body 2 protrudes forward of the leading edge and rearward of the trailing edge of the wing 1.

The rotation body 2 comprises at least two rotatably supported rotation segments 3, and in the two illustrated embodiments, the rotation body 2 respectively consists of four individually rotatably supported rotation segments 3A, 3B, 3C, 3D. Each rotation segment may be fabricated of any conventionally known aircraft construction materials using any conventionally known techniques, such as fiber-reinforced composite materials with a hollow core, or a foam core, or a honeycomb core, or light metal alloy skins with hollow cores or various supportive cores. Each respective rotation segment 3 is individually rotatably connected to and supported on the wing tip 1A of the wing 1, for example so as to be individually rotatable about a common axle shaft secured to the wing tip 1A so to extend along a rotation axis that is substantially parallel to the aircraft lengthwise axis. Moreover, any conventionally known actuators may be individually connected to the individual rotation segments 3 to be able to individually and selectively rotate each individual rotation segment 3 about the rotation axis 4.

A respective winglet 3 (particularly winglets 5A, 5B, 5C and 5D) are individually mounted on the respective rotation segments 3 (particularly 3A, 3B, 3C, and 3D) The winglets 5 may each be fabricated from any known aircraft construction material using any known fabrication techniques, and may be secured to the rotation segment 3 by any conventionally known means, such as integral molding of fiber reinforced composite materials, riveting of metal components, screwing, welding, or the like. Preferably, as discussed further below, the structure of the respective winglet 5 is pivotably or tiltably connected to the respective associated rotation segment 3 rather than being rigidly fixed relative to the rotation segment 3.

Since each rotation segment 3 is individually rotatable about the rotation axis 4, the respective winglets 5 respectively associated with the individual rotation segments 3 will be rotatable or pivotable about the rotation axis 4 by prescribed pivot angles γ relative to the horizontal plane 7 passing through the rotation axis 4, as especially shown in FIG. 2A as well as FIGS. 1C, 1D and 1E.

The individual winglets 5 can be embodied in the form of small lifting wings or airfoil wings with a relative thickness, aspect ratio and sweep angle similar to the main lifting wing.

In this context, the profile depth or chord length of a given winglet 5 can be different, namely smaller or larger, or alternatively the same, at the outboard tip of the winglet as compared to the inboard root of the winglet. It is also possible that each winglet 5 may be torsionally warped or twisted along its span length, so as to provide a varying angle or attack or pitch angle along its span length, possibly more noticeably than the main lifting wing 1 of the aircraft. The various different possible configurations of the winglet 5 will be selected based on the particular aerodynamic characteristics achieved thereby.

FIGS. 1C, 1D and 1E respectively show different arrangements of the winglets 5A, 5B, 5C and 5D for different operating conditions of the aircraft. For example, FIG. 1C shows the winglets 5A, 5B, 5C and 5D in a relatively flat or narrow fanned position, i. e. in which the winglets 5 are respectively adjusted to different pivot angles γ relative to each other, but over a relatively small angular range (e.g. 20 to 40°), whereby all of the winglets 5 protrude substantially laterally outward away from the wing tip 1A of the wing 1. Such an arrangement or configuration is suitable as a cruise flight position of the winglets 5, for minimizing induced wingtip drag.

On the other hand, FIG. 1D shows an arrangement in which the winglets 5 are pivoted to their maximum tilted end positions upwardly or downwardly, i. e. so that they are positioned at an angle γ of at least +90° (vertically upward) or at least −90° (vertically downward) relative to the horizontal plane 7. Such a position or arrangement of the winglets 5 corresponds to a parking position to be used when the aircraft is carrying out ground operations or particularly parking at a ramp or jetway or the like, where a minimized wing span is advantageous.

FIG. 1E shows a position of the winglets 5 that is suitable for take-off and landing of the aircraft A. In this position or arrangement, the respective winglets 5 are spread-out or fanned-out relatively widely apart from each other (e.g. spanning an angular range of 90 to 100°), so as to generate a maximum counter vortex to counteract the undisturbed wing tip vortex.

In this context, the selection of which individual winglets 5A, 5B, 5C and 5D are tilted or pivoted upward or downward is freely selectable. In other words, each one of the winglets 5 can be individually pivoted to any position within the maximum angular range from at least +90° through at least −90°. Thus, the fanned-out arrangements or spread-out arrangements shown in FIGS. 1C, 1D and 1E are each merely one possible relative arrangement of the four winglets 5A, 5B, 5C and 5D, as regards the upward or downward pivoted position of each winglet relative to its neighbors.

FIG. 2A shows a detail front view of a single rotation segment 3 with its respective associated winglet 5 mounted thereon. The lengthwise axis or span width axis of the winglet 5 can be rotated or pivoted by the pivot angle γ relative to the horizontal plane 7 extending through the rotation axis 4, by means of a corresponding pivoting rotation of the rotation segment 3. Thereby the pivot angle γ can extend through an angular range between at least +90° and at least −90°. This allows each winglet 5A, 5B, 5C or 5D to be individually positioned in any selected pivot position, for example in the configurations shown in FIGS. 1C, 1D and 1E as discussed above.

The top view of the rotation segment 3 with its winglet 5 as shown in FIG. 2B shows that the winglet 5 extends at a fixed sweep angle β relative to the geometric aircraft transverse axis 9, such that the winglet 5 is swept back relative to the air flow or relative wind 8. In this context, the local incident air flow or relative wind 8 is not always necessarily parallel to the rotation axis 4 of the rotation body 2 or the respective rotation segment 3, but instead it will vary between the winglet roots and the winglet tip.

FIG. 2C shows a side view or end view of a respective rotation segment 3 with its associated winglet 5, whereby the view is taken along the aircraft transverse axis 9 as shown in FIG. 2B. Particularly, the winglet tip end is pointing toward the viewer while the winglet root is pointing away from the viewer. A local incidence angle or pitch angle α is defined between the local winglet profile or chord and the local incident air flow or relative wind 8. Preferably, the winglet 5 is pitchable or tiltable substantially about its span width axis 6 so that the local incidence angle α is adjustable. To achieve this, the respective winglet 5 is mechanically connected to the associated rotation segment 3 via a rotatable joint 10. A sensor 11 is preferably provided, for example mounted on the respective rotation segment 3 as shown in FIG. 2B, to measure the local incident air flow or relative wind 8, and to thereby provide signals for controlling or regulating the pitch angle adjustment of the respective winglet 5.

FIG. 2D shows a section through the root end of a respective winglet 5, indicating the possibility of arranging a rotatable or tiltable trailing edge flap 12 on the winglet 5 so as to selectively increase the lift generated by the winglet 5. In this manner, the vortex that is generated by the overall winglet arrangement can be strengthened or increased as desired. Also, by adjusting the incidence angle of the winglets 5 as described above, and by deflecting the flaps 12, it is possible to operate the winglet arrangement to have the effect of an effective aileron at the outboard tip end of the respective lifting wing.

The system according to the invention further preferably includes actuators as mentioned above connected to a computer controller, such as the general aircraft control computer, which provides control signals to the actuators to individually control the pivoting position of each respective rotation segment 3 and its associated winglet 5. Furthermore, the computer controller may adjust the inclination angle or pitch angle of each winglet 5, and/or deploy the trailing edge flaps as described above. The computer controller automatically, and/or under pilot control, appropriately carries out the three following control modes or regulation modes. In a first mode selected during take-off and landing of the aircraft, the winglets 5 are adjusted to provide a maximum winglet counter vortex that acts against the natural wing tip vortex so as to achieve a minimized total wing tip vortex, for example, with the respective winglets 5 broadly spread as shown in FIG. 1E. In a second mode that is appropriate for cruise flight of the aircraft, the winglets are arranged so as to achieve a minimum induced flow resistance or drag, for example by having the winglets extending substantially outwardly from the wing tip of the main lifting wing, with a relatively small spread angle range among the several winglets, for example as shown in FIG. 1C. In a third mode, the winglets are positioned to achieve a minimum wingspan width of the aircraft, for example while taxiing on the ground and while parking at a ramp or jetway, whereby the winglets are tilted to a maximum upright or maximum downward position, for example as shown in FIG. 1D.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

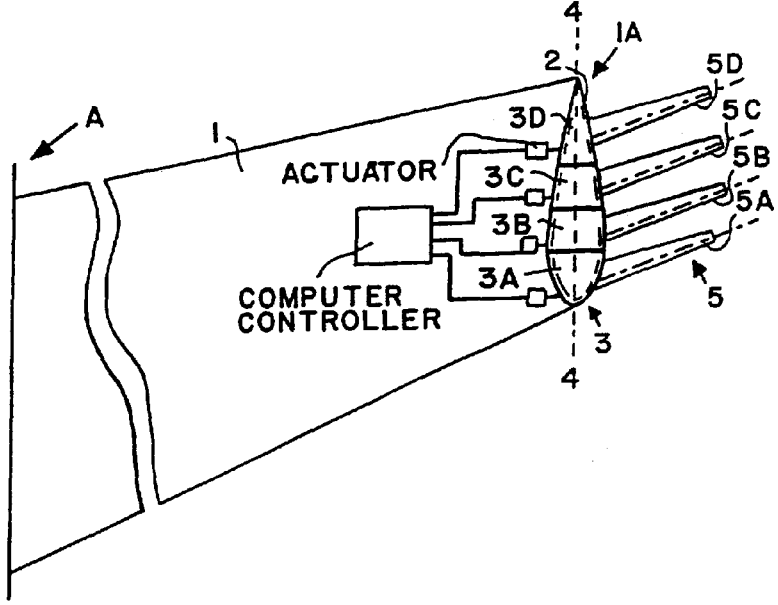

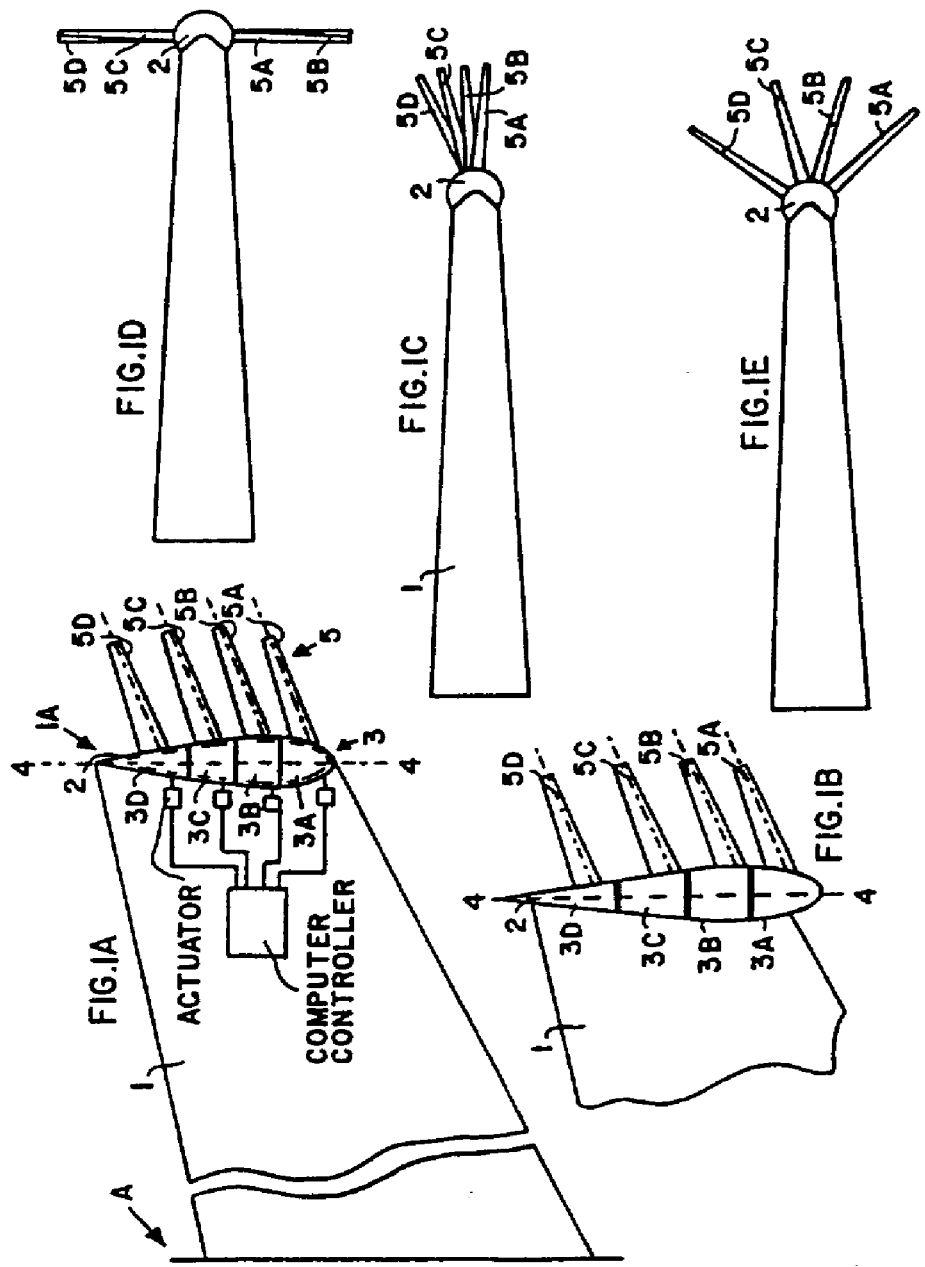

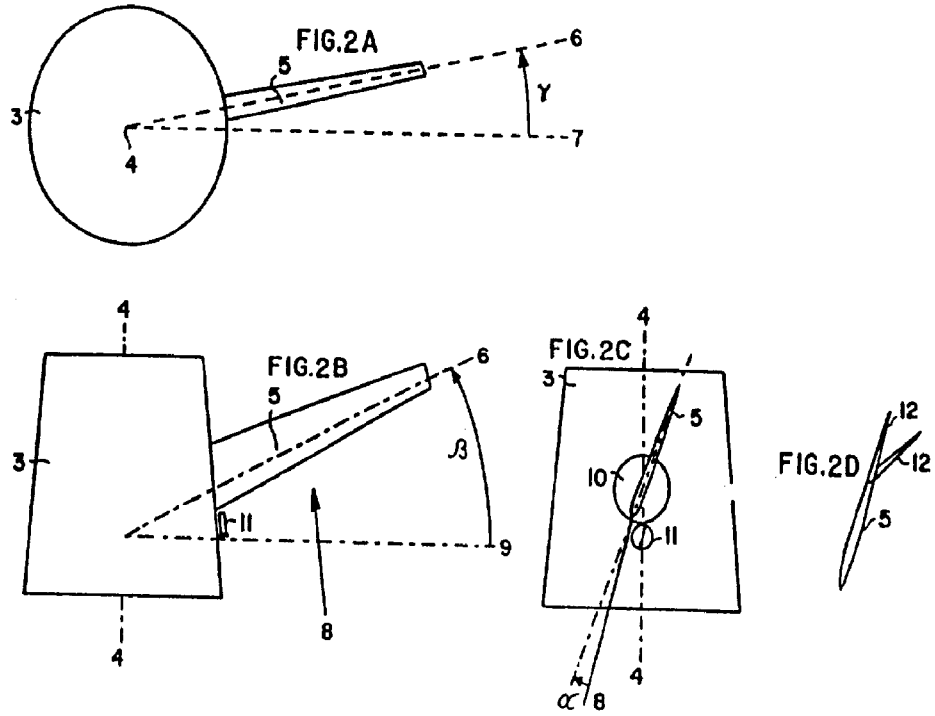

What is claimed is:

1. A wing tip winglet arrangement for a subsonic aircraft comprising:
   a lifting wing of an aircraft, having a wing tip;
   a rotation body mounted on said wing at said wing tip, wherein said rotation body has a streamline-shaped outer contour and comprises at least two rotation segments that are each individually rotatably supported relative to said wing so that each one of said rotation segments is rotatable about a rotation axis extending substantially parallel to a longitudinal axis of the aircraft;
   a plurality of winglets of which at least one respective winglet is mounted respectively on each one of said rotation segments so as to protrude outwardly away from said rotation axis;
   a plurality of actuators respectively coupled to said rotation segments and respectively adapted to selectively impart a selected rotation individually on said rotation segments; and
   a computer controller connected for control signal transmission to said actuators;
   wherein each respective one of said rotation segments with said at least one respective winglet mounted thereon is rotatable individually and independently of each other one of said rotation segments about said rotation axis in a range of a pivot angle ($\gamma$) relative to a horizontal plane passing through said rotation axis, wherein said pivot angle ($\gamma$) ranges from at least +90° with said respective winglet extending vertically upward to at least −90° with said respective winglet extending vertically downward; and
   wherein said computer controller is programmed and adapted to control said actuators to carry out a first regulation mode during take-off and landing of the aircraft with minimized wing tip vortex generation by positioning said rotation segments and said winglets so as to maximize the generation of a winglet counter vortex, a second regulation mode during cruise flight of the aircraft by positioning said rotation segments and said winglets so as to minimize the induced wing tip drag, and a third regulation mode during ground operation and parking of the aircraft by positioning said rotation segments and said winglets so as to minimize a total wing span of the aircraft.

2. The wing tip winglet arrangement according to claim 1, wherein said wing is a backswept wing, and wherein said winglets are configured and arranged so as to reduce induced drag and to reduce wing tip vortex wake generation.

3. The wing tip winglet arrangement according to claim 1, wherein said rotation body comprises a total of four of said rotation segments that are each independently rotatable about said rotation axis.

4. The wing tip winglet arrangement according to claim 1, wherein said rotation segments are arranged successively one after another along said rotation axis, and wherein said rotation segments respectively have respective different segment outer contours that together form said streamline-shaped outer contour of said rotation body.

5. The wing tip winglet arrangement according to claim 1 wherein said streamline-shaped outer contour is one of a teardrop-shaped contour, a bullet-shaped contour, and a torpedo-shaped contour.

6. The wing tip winglet arrangement according to claim 1, wherein said rotation axis extends parallel to a wing tip chord line of said wing at said wing tip.

7. The wing tip winglet arrangement according to claim 1, wherein at least one of said rotation segments has a segment thickness measured diametrically relative to said rotation axis, which segment thickness is at least equal to a local wing thickness of said wing measured perpendicular to a chord line of said wing at said wing tip.

8. The wing tip winglet arrangement according to claim 7, wherein said segment thickness is greater than said local wing thickness.

9. The wing tip winglet arrangement according to claim 1, wherein said rotation body has a body length measured along said rotation axis, which body length is at least equal to a local wing chord length of said wing measured along a chord line of said wing at said wing tip.

10. The wing tip winglet arrangement according to claim 9, wherein said body length is greater than said local wing chord length, and said rotation body protrudes forward of a leading edge of said wing and aft of a trailing edge of said wing.

11. The wing tip winglet arrangement according to claim 1, wherein said winglets are arranged to extend longitudinally swept back at a positive winglet sweep angle ($\beta$) relative to a geometric transverse axis of the aircraft extending transversely perpendicular to the longitudinal axis of the aircraft.

12. The wing tip winglet arrangement according to claim 11, wherein each one of said winglets has a respective thickness and wingspan that are smaller than and proportional to a respective wingspan and thickness of said lifting wing, and said winglet sweep angle of each said winglet corresponds to a wing sweep angle of said lifting wing.

13. The wing tip winglet arrangement according to claim 1, wherein each of said winglets has a tapered plan form, with respective different chord lengths at a root end of said winglet and a tip end of said winglet.

14. The wing tip winglet arrangement according to claim 1, wherein each one of said winglets has a torsionally twisted configuration providing a varying pitch angle successively along a longitudinal span of said winglet.

15. The wing tip winglet arrangement according to claim 1, further comprising a respective rotatable joint that rotatably mechanically mounts a respective one of said winglets onto a respective one of said rotation segments, so that said respective winglet may be rotated relative to said respective rotation segment so as to vary an inclination angle of said respective winglet relative to a local relative wind direction.

16. The wing tip winglet arrangement according to claim 15, further comprising a wind sensor arranged at a root end of said winglet and adapted to measure said local relative wind direction.

17. The wing tip winglet arrangement according to claim 1, wherein at least one of said winglets includes a winglet body and a winglet flap tiltably connected to an aft edge of said winglet body to form a trailing edge of said winglet.

18. The wing tip winglet arrangement according to claim 11, wherein each one of said winglets respectively has a relative thickness, aspect ratio and sweep angle similar to said lifting wing.

19. The wing tip winglet arrangement according to claim 11, wherein each one of said winglets respectively has an aspect ratio and a sweep angle corresponding to an aspect ratio and a sweep angle of said lifting wing.

20. The wing tip winglet arrangement according to claim 1, wherein said winglets can be selectively positioned in a broad fanned-out arrangement spanning an angular range of 90° to 100° about said rotation axis between the two most disparately rotated ones of said winglets, a narrow fanned-out arrangement spanning an angular range of 20 to 40° about said rotation axis between the two most disparately rotated ones of said winglets, and a maximum rotated position in which each of said winglets is rotated to a respective position with said pivot angle ($\gamma$) being at least +90° or at least −90°.

21. A method of operating an aircraft equipped with the wing tip winglet arrangement according to claim 1, comprising the following steps:
   a) flying said aircraft in a take-off phase comprising taking off from a runway;
   b) flying said aircraft in a landing phase comprising landing on a runway; and
   c) during said take-off phase and said landing phase, issuing control signals from said computer controller to said actuators to carry out said first regulation mode so that said actuators rotate said rotation segments and therewith said winglets into a broad fanned-out arrangement wherein each said winglet is positioned at a respective different value of said pivot angle ($\gamma$).

22. The method according to claim 21, wherein the two most disparately rotated ones of said winglets span an angle therebetween about said rotation axis in a range from 90° to 100°.

23. The method according to claim 22, wherein said winglets each respectively include a winglet body and a winglet flap pivotably connected to an aft edge of said winglet body, and wherein said step c) further includes deflecting said winglet flap relative to said winglet body in said first regulation mode during said take-off phase and during said landing phase.

24. A method of operating an aircraft equipped with the wing tip winglet arrangement according to claim 1, comprising the following steps:
   a) flying said aircraft in cruise flight; and
   b) during said cruise flight, issuing control signals from said computer controller to said actuators to carry out said second regulation mode so that said actuators rotate said rotation segments and therewith said winglets into a narrow fanned-out arrangement wherein each said winglet is positioned at a respective different value of said pivot angle ($\gamma$).

25. The method according to claim 24, wherein the two most disparately rotated ones of said winglets span an angle therebetween about said rotation axis in a range from 20° to 40°.

26. A method of operating an aircraft equipped with the wing tip winglet arrangement according to claim 1, comprising the following steps:
   a) operating said aircraft on the ground by taxiing or parking said aircraft; and
   b) during said taxiing or parking, issuing control signals from said computer controller to said actuators to carry out said third regulation mode so that said actuators rotate all of said rotation segments and therewith all of said winglets into respective positions with said pivot angle ($\gamma$) being at least +90° or at least −90°.

* * * * *

UNITED STATES PATENT AND TRADEMARK OFFICE
CERTIFICATE OF CORRECTION

| | |
|---|---|
| PATENT NO. : 6,345,790 B1 | |
| DATED : February 12, 2002 | |
| INVENTOR(S) : Brix | |

It is certified that error appears in the above-identified patent and that said Letters Patent is hereby corrected as shown below:

Title page,
The Title page, showing an illustrative figure, should be deleted and substituted therefor the attached title page.

Drawings,
Delete drawing sheets 1-2, and substitute therefor the drawing sheets consisting of Figs. 1A-2D, as shown on the attached pages.

Column 2,
Lines 35 to 60, replace to read:
Two significant problems have been crystallized or realized during the research and development of future high capacity aircraft. These two problems relate to issues other than the reduction of the induced flow resistance or drag. For one, it has been determined that the wing span width of such aircraft cannot become ever larger at will. Rather, the maximum wing span width must be limited to 80 m, for example, even though a further demand for improving the glide ratio of such aircraft exists, which would be served by further increasing the wing span width. As a second problem, such large high capacity aircraft have further increased the significant risk posed to aircraft that follow after such a high capacity aircraft during take-off or landing and thereby fly into the wing tip vortex wake of the high capacity aircraft. As a result, there is a high demand for measures that will minimize the negative effects of such wing tip vortices generated at the wing tips of high capacity aircraft.

SUMMARY OF THE INVENTION
In view of the above, it is an object of the invention to provide measures on a subsonic aircraft that achieve a reduction of the induced flow resistance or drag, make it possible to fly with a greater wingspan width as compared to the wingspan of the aircraft during parking of the aircraft at a ramp or jetway, and simultaneously achieving a minimization of the risks of wing tip vortices posed to following aircraft during flight. The invention further aims to avoid or overcome the disadvantages of the prior art, and to achieve additional advantages, as are apparent from the present specification.

UNITED STATES PATENT AND TRADEMARK OFFICE
CERTIFICATE OF CORRECTION

PATENT NO. : 6,345,790 B1
DATED : February 12, 2002
INVENTOR(S) : Brix

It is certified that error appears in the above-identified patent and that said Letters Patent is hereby corrected as shown below:

The above objects have been achieved according to the invention in a subsonic aircraft, preferably having backswept wings, wherein the tips of the lifting wings are equipped with so-called winglets. Particularly according to the invention, a streamline shaped rotation body is arranged at the tip of each lifting wing, whereby each such rotation body comprises at least two rotatably supported rotation segments. Further according to the invention, a respective winglet is mounted on each respective rotation segment, and each rotation segment with its associated winglet is individually pivotable in a prescribed angular range relative to the aircraft horizontal plane, about an axis of the rotation body that is approximately parallel to the aircraft lengthwise axis. Here, "approximately parallel" means within such a range to be generally parallel to the longitudinal axis of the aircraft or to the relative wind airflow direction or to the chord line of the wing at the wing tip. More particularly, the winglet or winglets of each respective rotation segment is/are pivotable through an angular range to respective pivoting end positions with an angle of at least +90° (vertical or perpendicularly upward relative to the horizontal plane of the aircraft) or of at least -90° (vertical or perpendicularly downward relative to the horizontal plane of the aircraft), with the angular range spanning between these end positions.

Column 2,
Lines 61 to 67, delete these entire lines.

Column 3,
Lines 1 to 50, replace these lines to read:
In addition to being rotatable about the axis of the rotation body, each winglet is preferably arranged on the respective rotation segment with a fixed or variable sweepback angle as well as a variable angle of incidence relative to the airflow direction or relative wind. The rotation body preferably has an optimized aerodynamic streamline contour that can be generally regarded as a teardrop, torpedo, or bullet shape made up of the individual rotation segments, and preferably includes four of such rotation segments with four respective winglets for example. The adjustment of each winglet can be carried out individually and independently of the other winglets by relatively simple means, using any conventionally known actuators for rotating and tilting each winglet as required, as well as any conventionally known sensors for sensing the respective actual position of each individual winglet. The winglets may respectively be provided with trailing edge flaps. The possibility is provided that all winglets can be used as ailerons. The term "rotation" as used herein to describe the motion of the rotation segments and winglets about the rotation axis does not require free 360 ° rotation, but rather especially refers to a partial rotation or pivoting through less than 360 ° .

UNITED STATES PATENT AND TRADEMARK OFFICE
CERTIFICATE OF CORRECTION

PATENT NO.    : 6,345,790 B1
DATED         : February 12, 2002
INVENTOR(S)   : Brix It is certified that error appears in the above-identified patent and that said Letters Patent is hereby corrected as shown below:

In view of the relatively simple, adaptable and flexibly configurable arrangement according to the invention, the present winglet arrangement can easily be retrofitted on existing aircraft, as well as being incorporated into new aircraft.

<u>Column 5,</u>
Line 1, after "winglet", replace "3" by -- 5 --.

Signed and Sealed this

Eleventh Day of June, 2002

Attest:

Attesting Officer

JAMES E. ROGAN
*Director of the United States Patent and Trademark Office*

(12) United States Patent
Brix

(10) Patent No.: US 6,345,790 B1
(45) Date of Patent: Feb. 12, 2002

(54) SUBSONIC AIRCRAFT WITH BACKSWEPT WINGS AND MOVABLE WING TIP WINGLETS

(75) Inventor: Wolfgang Brix, Delmenhorst (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/591,880

(22) Filed: Jun. 12, 2000

(30) Foreign Application Priority Data

Jun. 12, 1999 (DE) .......................... 199 26 832

(51) Int. Cl.[7] .................................................. B64C 23/06
(52) U.S. Cl. ............................ 244/199; 244/46; 244/91
(58) Field of Search ........................ 244/46, 198, 199, 244/91

(56) References Cited

U.S. PATENT DOCUMENTS

| | | | | |
|---|---|---|---|---|
| 3,270,988 A | * | 9/1966 | Cone, Jr. | 244/199 |
| 4,172,574 A | * | 10/1979 | Spillman | 244/199 |
| 4,598,885 A | * | 7/1986 | Waitzman | 244/199 |
| 4,722,499 A | | 2/1988 | Klug | |

FOREIGN PATENT DOCUMENTS

| | | |
|---|---|---|
| DE | 2149956 | 4/1973 |
| DE | 3242584 | 5/1984 |
| DE | 3621800 | 1/1988 |
| GB | 1584348 | 2/1981 |

\* cited by examiner

*Primary Examiner*—Galen L. Barefoot
(74) *Attorney, Agent, or Firm*—W. F. Fasse; W. G. Fasse

(57) ABSTRACT

A subsonic aircraft having backswept lifting wings is equipped with individually rotatable winglets at the wing tips thereof, in order to reduce drag during cruise flight, to minimize the dangers posed by wing tip vortices to following aircraft during take-off and landing, and to minimize the total wingspan during ground operations, with respective different positions of the winglets. A streamline-shaped rotation body made up of at least two individually rotatably supported rotation segments is mounted on the wing tip of each lifting wing. A respective winglet is mounted on each respective rotation segment. Each rotation segment with its associated winglet is individually rotatable about a rotation axis of the rotation body extending substantially parallel to the aircraft lengthwise axis. Thereby, each winglet is individually pivotable to any selected pivot angle relative to a horizontal plane extending through the rotation axis. Each winglet and its associated rotation segment is rotatable through an angular range between maximum end limits of at least +90° (vertically upward) and at least −90° (vertically downward) relative to the horizontal plane.

26 Claims, 2 Drawing Sheets